May 28, 1935.　　　　　D. B. LEE　　　　　2,002,899
VEHICLE VENTILATING APPARATUS
Filed April 30, 1934　　　2 Sheets-Sheet 2
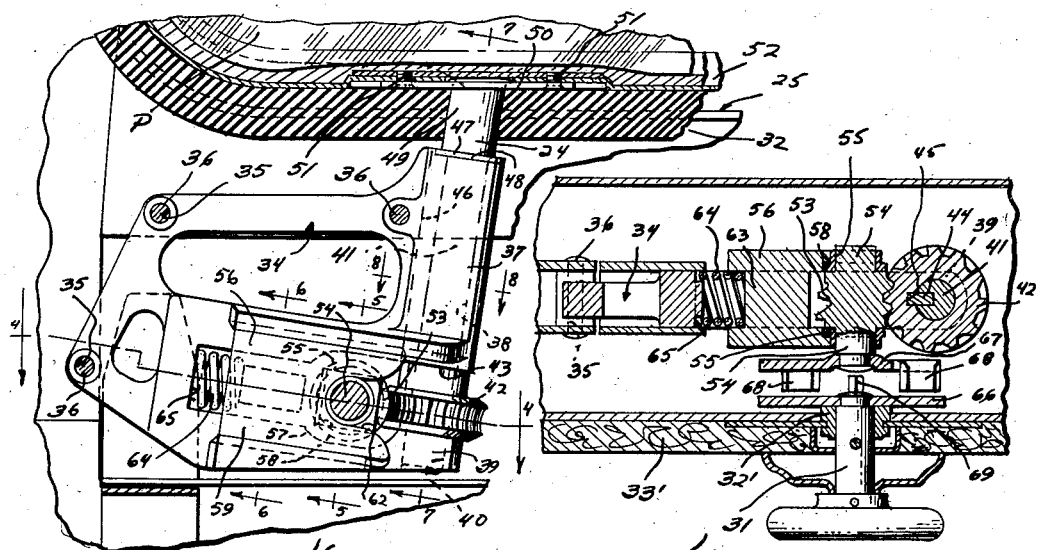
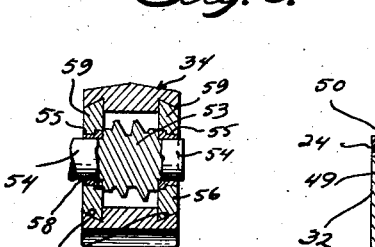
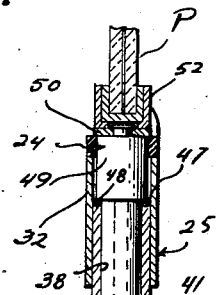
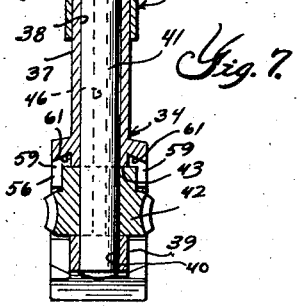
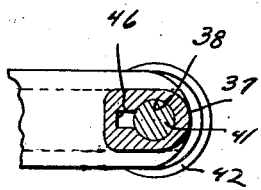
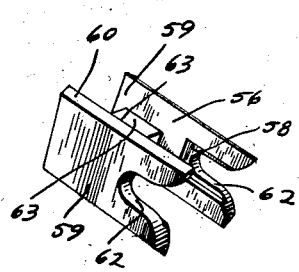
INVENTOR
Dwight B. Lee
BY
Whittemore Hulbert & Whittemore & Belknap
ATTORNEYS Patented May 28, 1935

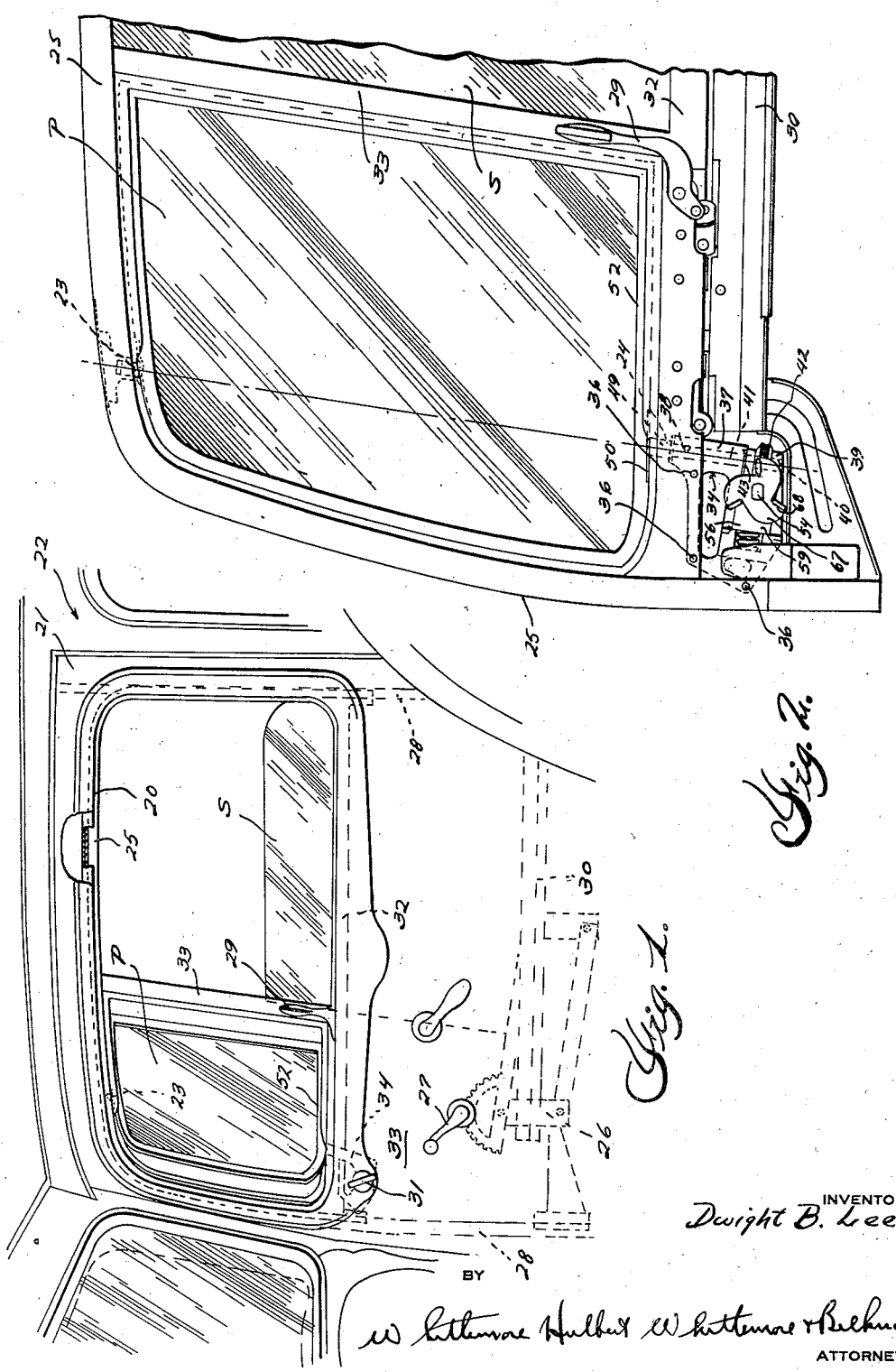

2,002,899

UNITED STATES PATENT OFFICE 2,002,899

VEHICLE VENTILATING APPARATUS

Dwight B. Lee, Detroit, Mich.

Application April 30, 1934, Serial No. 723,254

5 Claims. (Cl. 296—44)

This invention relates to vehicle ventilating apparatus and more particularly to improvements in that type of ventilating window shown and described in my copending application, Serial No. 691,882.

Ventilating window constructions of the type to which this invention pertains comprise a composite window including pivoted and sliding panels operable independently of one another in effecting the control of the ventilating window, and also operable as a unit so that they may be simultaneously raised into and lowered from the window opening.

The type of construction just referred to includes a frame in which the pivoted panel is mounted which frame is adapted in one position of the parts to be raised into registration with the window opening, this frame carrying means operatively associated with the pivoted panel for swinging the pivoted panel about its pivots when the frame has been brought into registration with the window opening.

One of the important objects of this invention is to provide an improved construction of means for actuating the pivoted panel so designed that the same may be quickly and economically manufactured and assembled with facility.

The several objects, advantages and novel details of construction of the invention will be made more apparent as this description proceeds, especially when considered in connection with the accompanying drawings, wherein Figure 1 is a fragmentary perspective view of the inside portion of the front of a closed vehicle body having my improved ventilating window associated therewith;

Figure 2 is an enlarged fragmentary elevational view of the pivoted panel, the associated portion of its supporting frame, and the operating means for the panel;

Figure 3 is an enlarged fragmentary sectional elevational view showing the pivoted panel operating means;

Figure 4 is a sectional view taken substantially on the plane indicated by line 4—4 in Figure 3;

Figure 5 is a vertical sectional view taken substantially on the plane indicated by line 5—5 in Figure 3;

Figure 6 is a similar view taken substantially on the plane indicated by line 6—6 in Figure 3;

Figure 7 is a vertical sectional view taken substantially on the plane indicated by line 7—7 in Figure 3;

Figure 8 is a fragmentary horizontal sectional view taken substantially on the plane indicated by line 8—8 in Figure 3;

Figure 9 is a perspective view of the housing or supporting frame for the worm gearing of the pivoted panel operating means, and Figure 10 is a perspective view of the worm retainer or trunnion bearing member.

As described in my copending application heretofore referred to, the herein described type of ventilating window structure comprises a pivoted panel P and a sliding panel S adapted to cooperate to close a window opening 20 arranged, for instance, in the door 21 of a motor vehicle or the like 22.

The pivoted panel P is pivotally supported intermediate its vertical edges by means of pivots 23 and 24 on a frame 25 adapted to be raised into registration with the window opening 20 and lowered into the well of the door in any suitable manner, preferably by means of a window lifter mechanism indicated generally by the reference character 26 having an operating handle 27. The reference character 28 indicates the customary channels in which the frame 25 slides when being raised into and out of registration with the window opening. Means controlled by a handle 29 is adapted either to couple the frame 25 with the retainer 30 of the window lifter mechanism 26 so that the frame, together with the front panel, may be simultaneously raised and lowered, or to uncouple the frame 25 from the retainer 30 and to couple the same with a fixed part of the door or window casing so that the sliding panel S may be raised and lowered independently of the frame and pivoted panel. The means for accomplishing this is not shown in the accompanying drawings and will not be herein described in detail as the details of this construction form no part of the present invention.

When the frame 25 is raised into registration with the window opening, the operating mechanism for the pivoted panel P, yet to be described more in detail, comes into registration with an operating member 31 rotatably mounted in a fixed bearing 32' on the inner panel 33' of the vehicle body or door.

Extending transversely of the frame 25 is a substantially horizontal frame member 32. A vertically arranged frame member 33 may be provided extending vertically between the frame 32 and the top portion of the frame 25, this frame member 33 cooperating with the adjacent portion of the frame 25 to define the opening adapted to be closed by the pivoted panel P. In the present form of the invention herein illustrated, the pivoted panel P is provided with a mechanism in the from of worm gearing. In accordance with this invention, the worm gear housing or supporting frame is preferably formed in one piece as a die casting, the same being illustrated in Figure 9 and designated generally by the reference character 34. This housing or frame is provided with one or more transversely extending openings 35 through which securing elements 36 may be passed for attaching the frame or housing to the frame 25—32.

The housing is provided with a portion 37 formed with a longitudinally extending substantially vertically arranged bore or opening 38 and with a cooperating portion 39 having an aligned bore or opening 40. These aligned openings are adapted to receive and rotatably support the shaft 41 of a worm wheel or gear 42. In assembling the shaft and worm wheel with the housing 34, the worm is positioned in the space 43 between the housing portions 37 and 39 and the shaft is inserted from the top and passed downwardly through the bore 38 thence through an opening in the hub of the gear wheel, and thence into the bore 40 of the housing part 39. This shaft 41 is provided with a key 44 which engages a keyway 45 in the gear wheel 42. The shaft and key have a tight pressed fit with the gear wheel but the shaft is dimensioned to rotate in the bores 38 and 40. In order to permit the insertion of the key portion of the shaft 41 the bore 38 is provided with a keyway 46. Prior to the assembly of the shaft with the housing 34, a thrust plate 47 is slipped over the shaft 41 from the lower end thereof, this thrust plate resting on the upper face 48 of the housing portion 37 and engaging an enlarged end portion 49 of the shaft 41.

Rigidly fixed, such as by riveting, to the upper end of the shaft 41 is a plate 50 which is secured, as for instance by securing elements 51, to the frame 52 of the pivoted panel P.

The shaft 41 constitutes the lower pivot 24 of the panel P heretofore referred to. For the purpose of facile assembly, the width of the attaching plate 50 and the diameter of the enlarged portion 49 of the shaft 41, as well as the width of the housing portion 37, is such that these parts may be assembled with the frame part 32 by inserting the same upwardly from the bottom. Thereafter the housing may be attached to the frame by the fastening elements 36 and the attaching plate 50 may be secured to the frame of the pivoted panel by operating the gearing to bring the attaching plate to an angular position with respect to the frame to permit the insertion from below of the attaching elements 51.

After the shaft 41 is assembled with the worm wheel 42, disengagement of these parts from the housing is prevented by the engagement of the enlarged shaft portion 49 and thrust plate 47 with the housing 34 on the one hand, and the engagement of the upper end face of the gear wheel 42 against the housing on the other hand.

To further facilitate the assembly of this unit, and to eliminate the necessity of exercising extreme accuracy, which from a practical standpoint is impossible in production, means is provided for mounting the worm of the worm gear unit in movable trunnion bearings with means for urging the worm constantly into operative engagement with the worm wheel. This construction which is about to be described also provides a simple means of taking up wear between the worm and worm wheel and is otherwise highly satisfactory.

The worm 53 preferably has the shaft or trunnions 54 thereof journalled in bushings 55 which in turn are mounted in a retainer 56, shown in perspective view in Figure 10. These bushings are preferably each formed with a rectangular portion 57 which is received in recesses 58 formed in the opposed vertical faces of the side plates 59 of the retainer 56. These side plates are provided with beveled longitudinal edges adapted to be received in beveled undercut portions 61 which form a slideway to slidably receive the retainer for movement in a plane at right angles to the axis of the shaft 41. The ends of the trunnions or shaft 54 of the worm extend through open ended slots 62 formed in the side plates of the retainer so that the bushings 55 and the worm may be readily assembled with the retainer through the open ends of these slots 62.

The two side plates 59 of the retainer are connected by a cross piece 63 against which one end of a coil spring 64 is adapted to engage, the other end of this coil spring engaging the end face 65 of the slotted portion of the housing 34.

Thus it will be seen that when the retainer, together with the spring and the worm, are assembled the spring acts to constantly urge the retainer and, as a consequence, the worm toward the worm wheel 42 into operative engagement therewith.

In assembling the unit, the retainer and spring and worm are first assembled with the housing 34 and the retainer is drawn against the spring to compress the same. With these parts held in this position, the shaft 41 and the worm wheel 42 are assembled as heretofore described whereupon the retainer is released and the worm is brought into meshing relation with the worm wheel.

It is obvious that if the axis of the worm were fixed with relation to the axis of the worm wheel extreme accuracy, practically impossible in mass production, would be necessary in order to insure proper engagement between the worm and the worm wheel. However, with the present arrangement such accuracy is unnecessary and in addition wear between the gear parts is compensated for because the worm is constantly urged into operative engagement with the worm wheel and any inaccuracy in manufacture is compensated for.

Moreover, with the herein described construction, the assembly consisting of the housing 34 and the worm gearing with the associated parts may be assembled as a unit and as such assembled with the frame 25—32 and the pivoted panel P.

For cooperation with the driving gear section 66 of the control handle 31 is a gear section 67 rigidly secured to one end of the worm shaft 54. In the embodiment illustrated, the section 67 is provided with one or more projections or teeth 68 adapted to be engaged by one or more teeth or projections 69 on the section 66 so that when the latter is turned the projections 69 thereof will engage one of the projections 68 to thus rotate the worm 53 and through the worm wheel 42 and shaft 41 adjust the pivoted panel about its pivots. The construction of these engaging gear sections 66—67 is such that the frame, together with the gear housing and parts carried thereby, may be raised and lowered without interference, it being only possible to actuate the pivoted panel after the frame 25 has been brought into registration with the window opening at which time the gear section 67 is brought into position opposite the driving gear section 66.

While an embodiment of this invention has been illustrated and described herein somewhat in detail, reservation is made to make such changes as may come within the purview of the accompanying claims.

What I claim as my invention is:

1. In a ventilating window construction of the character described, a frame, a panel pivotally mounted in said frame, a gear supporting frame secured to said first frame, a worm wheel rotatably mounted on said supporting frame, a retainer slidably mounted on said supporting frame, a worm carried by said retainer, and means for urging said retainer toward said worm wheel.

2. In a ventilating window construction of the character described, a frame, a panel pivotally mounted in said frame, a gear supporting frame secured to said first frame, a worm wheel rotatably mounted on said supporting frame, a retainer having portions engaging ways on said supporting frame for slidably mounting said retainer thereon, a worm having trunnions journalled on said retainer, and spring means urging said retainer toward said worm wheel and holding said worm in engagement with said worm wheel.

3. In a ventilating window construction of the character described, a frame, a panel pivotally mounted in said frame, a gear supporting frame secured to said first frame, a worm wheel rotatably mounted on said supporting frame, a retainer provided with longitudinally extending beveled surfaces and opposed open ended slots at one end thereof, undercut portions on said supporting frame forming ways to receive said longitudinally extending beveled surfaces to slidably support said retainer, a worm having trunnions journalled in said open ended slots, and resilient means interposed between said supporting frame and said retainer for urging the latter in a direction to hold said worm in engagement with said worm wheel.

4. In a ventilating window construction of the character described, a frame, a panel pivotally mounted in said frame, a gear supporting frame secured to the first named frame, a worm wheel rotatably mounted on said supporting frame, a retainer slidably mounted on the supporting frame for movement toward the worm wheel and having the opposite edges engaging ways on said supporting frame, and a worm carried by the retainer and adapted to mesh with the worm wheel.

5. In a ventilating window construction for vehicle bodies having a window opening therein and having a well beneath the window opening, a frame insertable into the window opening, a panel adapted to close a portion of the window opening pivotally mounted in the frame, a gear supporting frame located in the window well and secured to the frame aforesaid, a worm wheel secured to a shaft journalled upon the supporting frame and having the upper end fixed to the pivoted panel forming one of the pivots of the latter, and a worm also mounted on the supporting frame and adapted to mesh with the worm wheel.

DWIGHT B. LEE.